United States Patent [19]

Bauer et al.

[11] Patent Number: 4,782,453

[45] Date of Patent: Nov. 1, 1988

[54] METHOD OF DETERMINING THE LOCATION OF A NAVIGATIONAL MAGNETIC FIELD SENSOR IN A VEHICLE

[75] Inventors: Harald Bauer, Nürnberg; Reinhard Helldörfer, Igelsdorf, both of Fed. Rep. of Germany

[73] Assignee: Robert Bosch GmbH, Stuttgart, Fed. Rep. of Germany

[21] Appl. No.: 898,376

[22] Filed: Aug. 20, 1986

[30] Foreign Application Priority Data

Sep. 27, 1985 [DE] Fed. Rep. of Germany ....... 3534480

[51] Int. Cl.$^4$ .............................................. G01C 17/38
[52] U.S. Cl. ...................................... 364/559; 33/356; 33/357
[58] Field of Search ....................... 364/457, 559, 571; 33/351, 352, 355 R, 356, 357, 358

[56] References Cited

U.S. PATENT DOCUMENTS

| | | | |
|---|---|---|---|
| 3,311,821 | 3/1967 | Brunel | 33/357 |
| 3,466,923 | 9/1969 | Corleis et al. | 33/357 |
| 4,358,886 | 11/1982 | Matsumoto et al. | 33/357 |
| 4,414,753 | 11/1983 | Moulin et al. | 33/356 |
| 4,416,067 | 11/1983 | Scherer et al. | 33/356 |
| 4,539,760 | 9/1985 | Marchent et al. | 33/356 |
| 4,546,551 | 10/1985 | Franks | 364/559 X |
| 4,611,293 | 9/1986 | Hatch et al. | 364/571 |

Primary Examiner—Parshotam S. Lall
Assistant Examiner—Thomas G. Black
Attorney, Agent, or Firm—Frishauf, Holtz, Goodman & Woodward

[57] ABSTRACT

To determine the optimal location for a magnetic field sensor in a navigational system in a vehicle, the field sensor is preliminarily and releasably secured at a first location in the vehicle, and then the vehicle is rotated by 360°, for example by moving it in a circular course. An evaluation circuit is connected to the field sensor which determines the maximum or minimum value of the entire field vector ($H_x$, $H_y$). The level of the disturbance field ($Hs_x$, $Hs_y$) is determined by carrying out the calculation by adding half of the respective maximum and minimum values in the respective vectorial directions. The steps are then repeated with a different location of the sensor and, when a minimum disturbance field is determined, the sensor can be secured to the vehicle. If the vehicle contains electrical equipment or appliances generating electromagnetic fields, for example electric motors, rear window defroster windings or the like, the testing steps should be repeated with the appliance energized so that any stray field generated thereby will not disturb the field sensor. Preferably, the disturbance field should be not over half of the saturation field of the sensor and, most desirably, should not be over half of geomagnetic field of about 16 A/m.

6 Claims, 2 Drawing Sheets

METHOD OF DETERMINING THE LOCATION OF A NAVIGATIONAL MAGNETIC FIELD SENSOR IN A VEHICLE

Reference to related publication: German Pat. No. DE 27 54 888.

The present invention relates to a navigational system in vehicles, and more particularly to a method to determine the location, in a vehicle, of a magnetic field sensor which is responsive to the geomagnetic field and, additionally, is responsive to stray or disturbance fields; and especially to a method to minimize the effect of such stray or disturbance fields on the sensor.

BACKGROUND

Various types of measuring systems are known to determine the geomagnetic field, for use in navigation. When applied to automotive or land vehicles, the stray fields, for example due to the chassis of a vehicle, or magnetic fields due to connected equipment, have the tendency to distort the geomagnetic field. It has previously been proposed—see German Pat. No. 27 54 888—to measure magnetic fields due to the vehicle or equipment installed therein, and to correct the sensor output by a respective correction value, or, alternatively, to determine the direction—vectorially—of the stray fields which affect the sensor. The stray fields are vectorially, directionally dependent. A typical magnetic field sensor is an element which responds in two orthogonal axes. The level of the magnetic field within the range of possible installations of the sensors may change substantially even upon moving of the sensor only by small distances, for example a few centimeters. In an automotive vehicle, a sensor is usually located either behind the dashboard, beneath the roof of the vehicle, or in the range of a rear window shelf. If an optimum location is determined for any particular type of vehicle, it is not a necessary consequence that all vehicles of this type will have the same stray fields generated at a specific location since, even in vehicles of the same type, different directions of drawing or rolling the sheet metal components thereof may differentially affect the sensor. Thus, the stray field at similiar locations even in vehicles of the same type may be different. Upon installation of a sensor at a location where the stray field is high, the magnetic field sensor may be subjected to fields which cause the sensor to saturate, resulting in erroneous output indications and output signals therefrom.

It is an object to provide a method to determine the optimum location for a magnetic field sensor in an automotive vehicle, and specifically at a location where the stray or disturbance field is so small that the sensor will not be subjected to saturation phenomena, and erroneous results will be avoided.

Briefly, a field sensor is preliminarily installed in a vehicle at a first location, and the vehicle is then rotated by 360°. During rotation of the vehicle, the output from the field sensor is measured in an evaluation circuit, and minimum and maximum values therefrom are determined; these minimum and maximum values are representative of the entire field to which the field vector is subjected. The level of the disturbance field is then determined by adding, in the respective vectorial directions, half of the respective maximum and minimum values. The foregoing steps are then repeated at a different location of the sensor. The respective results are stored or noted and, when a location is determined which results in minimum level of disturbance, the sensor is then securely affixed to the vehicle at that point.

The method has the advantage that a magnetic field sensor need not be permanently installed in the vehicle at a location where the disturbance field may be substantial; rather, in advance of the permanently fixed installation, the sensor is preliminarily installed and the specific sensor itself determines the field. External or special measuring elements are not required. The disturbance field should, preferably, be less than the geomagnetic field on the basis of which navigation is to be carried out; the method has the additional advantage that it is readily possible to select, from all possible locations, that one in which the ratio of geomagnetic field to disturbance field provides optimum results.

In accordance with a feature of the invention, a repetitive sequence, by trial and error, of locations of the disturbance field is carried out until at least at one location the field strength of the disturbance field is at the most equal, and preferably less than half the saturation field of the respective magnetic field sensor with respect to the X and Y axes of a vectorial diagram. When using an electronic compass with a computer, it is particularly desirable to provide a suitable computer program which, during rotation of the vehicle by 360°, that is, about one revolution, continuously determines the entire field vector and, hence, the maximum and minimum value of the entire field vector. The maximum and minimum values are then stored in a buffer store or the like, for example, which is addressed to calculate therefrom the level of the disturbance field in accordance with a simple and well known mathematical formula. The level can be displayed on a display. This permits, in the simplest manner, determining the level of the disturbance field, and the maximum and minimum value of the overall field vector with respect to the X-axis and the Y-axis, respectively, of the vectorial diagram with the associated values respecting the X and Y-axes.

Magnetic fields are generated not only by the fixed or permanent metal components of the vehicle but, additionally, may be transient or intermittent due to operation of electrical equipment within the vehicle. For example, electric motors, electromagnetic relays, or even electrical rear window defroster heaters and the like can generate magnetic fields which affect the magnetic field sensor. Particularly rear window defrosters, located within the rear window of a vehicle, may affect a magnetic field sensor located beneath the rear window shelf. In order to exclude disturbances from such electrical equipment, a location-determination cycle is carried out with the electrical equipment energized, and the disturbance field determined as described above. The sequence is then repeated and, if due to connection of electrical equipment or appliances, the disturbance field changes to an impermissible extent, the previously selected installation location can be changed and other, better locations determined by repeating the preliminary installation, rotation, and disturbance field determination steps.

DRAWINGS

DETAILED DESCRIPTION

Figure 1:
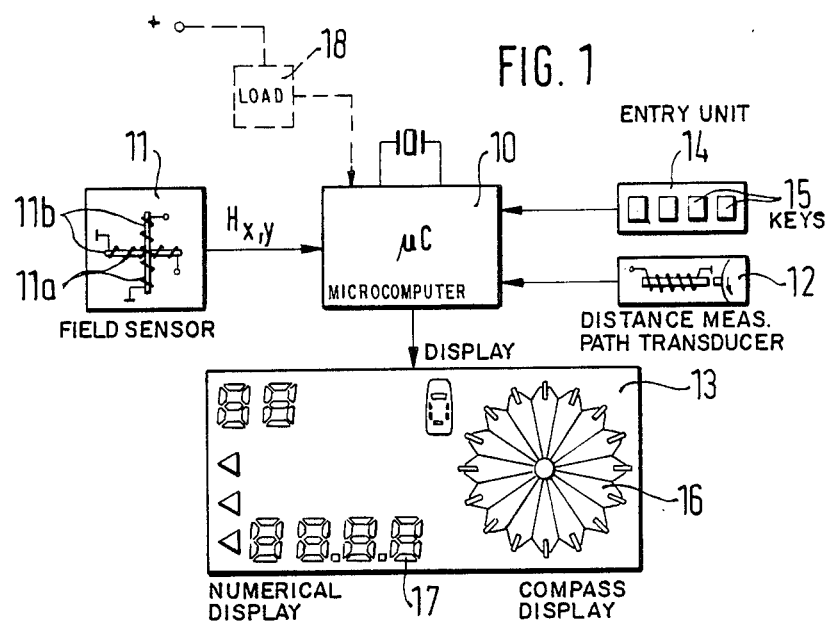
FIG. 1 is a schematic diagram of a basic system forming an electronic compass, for use in automotive vehicles, with a dual-axis magnetic field sensor.

The block diagram—see FIG. 1—illustrates a navigation system for an automotive vehicle. Generally, it includes an electronic compass which is capable of indicating the North direction or the direction of movement of the vehicle with respect to North, or the direction of a target, or destination point with respect to the instantaneous direction of movement of the vehicle. The navigation system, essentially, includes a microcomputer 10 which processes signals of a magnetic field sensor 11 and of a distance measuring element 12. The microcomputer is coupled to a display 13. A keyboard or entry unit 14, having a plurality of activating keys 15 is coupled to the microcomputer so that suitable electronic commands can be supplied to the microcomputer, and programs stored in the microcomputer can be accessed. The keys 15 of the keyboard can be arranged, for example, to provide an indication of the direction of travel on the display 13, to display the direction "North" or the direction of the vehicle with respect to a destination location. The keys 15 can be arranged to enter in the microcomputer 10 respective intermediate stops or locations. The display 13, in addition to the display of the direction of the vehicle with respect to a destination location, may include a compass display 16. Further, various numerical displays can be provided, for example a numerical display 17 which provides 7-segment liquid-crystal output configurations 17 representing, for example, distance to the destination. Additional information can be provided on the display 13 as desired, for example identification information regarding an intermediate destination or intermediate stop, scales relating to a road map, for example for entry of distances to an intermediate location or stop.

The display and the microcomputer itself do not form part of this invention and may be standard components available in numerous types of computer-equipped automotive vehicles; the computer includes an inherent clock, schematically illustrated by the crystal symbol in FIG. 1, and, as well known, is capable of carrying out various programs stored therein, or supplied by an external storage or memory.

Figure 2:
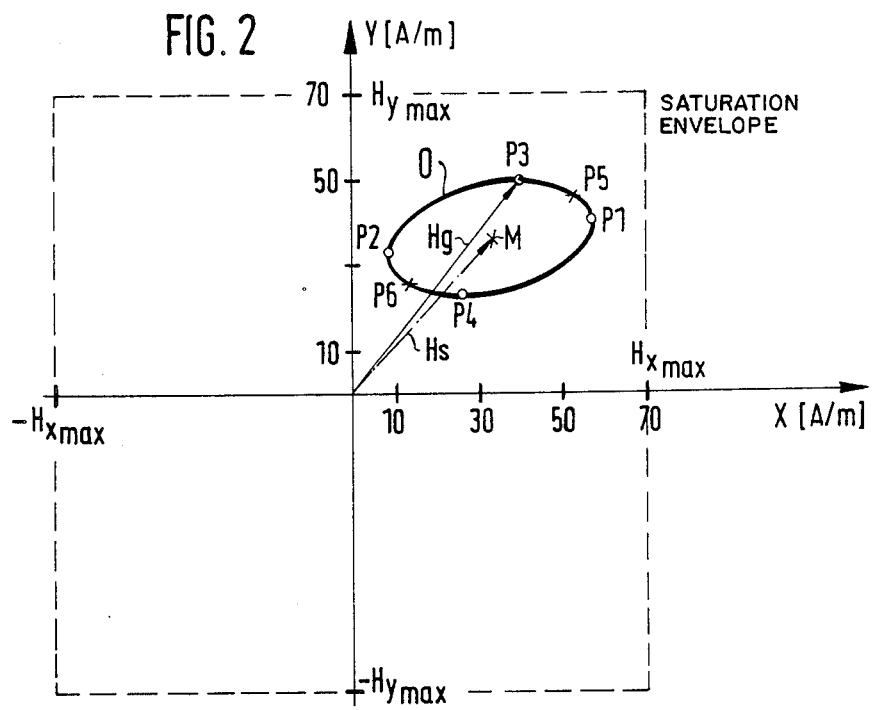
FIG. 2 is a vector diagram illustrating the measuring values determined by the magnetic field sensor.

The magnetic field sensor 11—see FIG. 1—is a dual-axis magnetometer, having two windings 11a which are located on magnetizable cores 11b. The cores are respectively rotated by 90°, and located closely above each other. The vector diagram for the magnetic field in one of these cores is shown in FIG. 2. FIG. 2 thus shows that at a field strength of ±70 A/m, the cores 11b will saturate. Outside of these field strengths, no suitable measuring values can be determined anymore. The region within which the cores are below saturation is shown by the broken line.

The two coils 11a, 11b are coupled to a current supply—not shown—and, further, connected to a wave-shaping stage, not shown, and usually closely coupled to the magnetic field sensors; the microcomputer 10 will receive from the sensor 11 the X-component signals and the Y-component signals representing the then existing magnetic field to which the sensor is exposed. The fields in the respective vectorial directions are indicated by the values $H_x$ and $H_y$. The microcomputer 10, by a suitable program, can determine the vector, or, respectively, the value of the entire magnetic field and/or its vectorial direction in either Cartesian or polar coordinate systems, for example by providing an output indication on the compass dial 16. The mathematical computation is well known and can be easily carried out by any appropriate microcomputer.

The magnetic field sensor 11 must be located in a position in which the magnetic field—that is, the entire magnetic field to which it becomes responsive—will not exceed maximum levels. Consequently, sensor 11 must be located in the vehicle at a position in which the stray field—however generated—superimposed on the geomagnetic field does not drive the sensor into saturation. Additionally, and preferably, the stray magnetic field should be as small as possible. It is known to derive the geomagnetic field from the entire magnetic field Hg to which the sensor is responsive. Upon rotation of the vehicle, the geomagnetic field, in the vector diagram, will define a locus curve 0 which has a center M which is shifted by the vector of the stray field Hs from the null point or origin of the vector diagram. The same effect can be obtained, of course, by merely rotating the field sensor although, for actual measurement, the vehicle should be rotated.

In accordance with a feature of the invention, the optimum location for the magnetic field sensor 11 is determined by first connecting the magnetic field sensor to a suitable current supply and then locating the sensor at a customary and desirable location in the vehicle without, however, fixedly securing the sensor thereto; the sensor is only preliminarily secured to the vehicle, so as to be separable therefrom again. One of the keys 15 of the input unit 14 is then operated which calls up a program in the microcomputer 10 to provide a display on the display 13 of the magnetic field Hg. If this field is within the tolerance limits—in the example selected 70 A/m, the sensor is shifted slightly until a minimum magnetic field is determined, and the sensor is then preliminarily secured to the vehicle. As the next step, the vehicle is driven through a closed circle or rotated by a turntable through 360°. The magnetic field sensor 11 continuously provides the $H_x$ and $H_y$ values, representative of the entire magnetic field Hg, to the microcomputer 10. The respective values are shown on the display 13, for example, during rotation, on the compass field 16. Upon rotation through 360°, the locus 0 will be passed. By a suitable program, the maximum and minimum levels $H_{x-max}$ and $H_{x-min}$, representative of points P1 and P2 relative to the X-axis is determined and temporarily stored. Similarly, the maximum and minimum values with respect to the Y-axis $H_{y-max}$ and $H_{y-min}$ of the entire field Hg is determined by the microcomputer, see points P3 and P4 in FIG. 2. A simple computer program then can determine the stray or disturbance field in the respective X and Y axial directions:

$$Hs_x = \tfrac{1}{2}(H_{x1} + H_{x2}) \tag{1}$$

$$Hs_y = \tfrac{1}{2}(H_{y3} + H_{y4}) \tag{2}$$

wherein
$H_{x1}$ corresponds to the field at measured point P1
$H_{x2}$ corresponds to the field at measured point P2
$H_{y3}$ corresponds to the field at measured point P3
$H_{y4}$ corresponds to the field at measured point P4.
From these values, the components $Hs_x$ and $Hs_y$ of the disturbance or stray field Hs can be calculated.

In a further program step, the microcomputer 10 is programmed to carry out the calculation:

$$Hs = \sqrt{Hs_x^2 + Hs_y^2} . \qquad (3)$$

Hs will be the value of the stray or disturbance field in A/m; it can be displayed on the 7-segment liquid-crystal (LC) display 17.

Upon subsequent operation of the key 15, or some other entry key, the display 13 is cleared and can be switched over again to indicate the overall field Hg.

The particular location of the sensor may not be the optimum location in the vehicle. Consequently, the particular location is marked, and the sensor is then preliminarily secured on a further suitable location in the vehicle; the programming steps previously described are repeated, and the vehicle is rotated by 360°; again, the level of the stray or disturbance field Hs is determined and displayed.

Various suitable locations, thus, are then tested in the vehicle and, in each instance, the specific there present stray field Hs is determined. One of these locations will have a minimum, and the field sensor is then located at that minimum location.

It may be that the so-selected minimum location is one which is close to an electrical load which, upon energization, generates a magnetic field. Thus, the previously measured stray field Hs may be substantially influenced thereby. If such equipment is present in the vehicle, it is necessary to repeat the determination of the stray field Hs with the load connected, and to determine if, then, the stray field changes, and, specifically, changes to an undesirable or prohibited extent. If such a prohibited or excessive change occurs, the previously referred to steps must be repeated to find a suitable location for the magnetic field sensor 11 which provides for minimum disturbance field thereat with or without connection of the electrical load.

If, with the loads connected, the locus 0 remains within previously determined limits, the magnetic field sensor 11 can then be securely attached to the vehicle at the thus found location. Upon subsequent calibration of the electrical compass, the locus 0 of the entire field Hg is determined by driving the vehicle in a circle or rotating the vehicle; the result is stored and, as well known, and during a navigation drive, the respective moving direction and/or the North direction or the destination direction is determined by the microcomputer and indicated with respect to the locus.

If, upon connection of a load 18—in FIG. 1 shown in dotted lines—, the magnetic field changes within the permissive limits of the sensor 19, it is also possible to carry out a rotation or circular path of the vehicle to determine the locus at that time and store the locus and its position in the vectorial system. The vehicle then must be so arranged that, upon energization of the respective load close to the location of the sensor, the navigation system switches between stored loci, that is, with or without the load connected. If, upon energization of the load, the locus 0 only shifts, then the shift can be readily stored and processed and easily corrected upon display of the navigation information.

Figure 3:
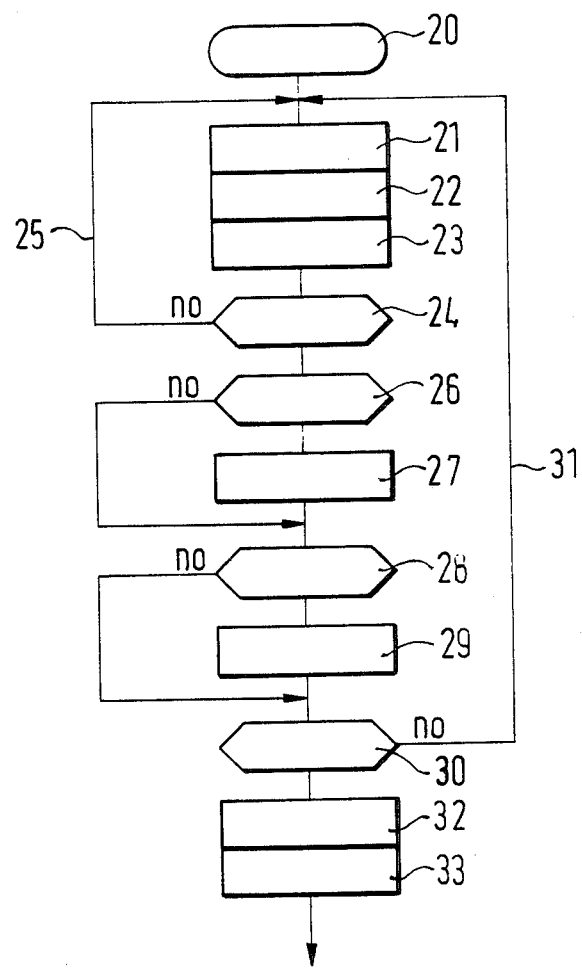
FIG. 3 is a flow chart to illustrate measuring of the stray or disturbance field affecting the sensor.

FIG. 3 is a flow diagram to show how the previously described steps can be carried out in even a simple microprocessor, and how a suitable installation location for the sensor 11 can be determined.

The respective program stored in the microcomputer 10 is called up by operation of one of the keys 15 of the entry unit 14. This results in a start command, command 20. The next step, step 21, processes the values supplied by the magnetic field sensor, namely the overall field values Hx, Hy which, then, is calculated in step 22 to determine the maximum level of the field (in polar coordinates) according to the formula $H = \sqrt{Hx^2 + Hy^2}$. This value is displayed during the display step 23.

The next step, step 24, tests if the vehicle is being driven in a circular path, or is being rotated. Let it be assumed that the vehicle is driven in a circular path. Pulses $i_s$ will be derived from the movement sensor 12 and coupled to the microcomputer 10. If the sensor 12 does not provide such pulses within predetermined time gaps, a loop 25 is entered to provide for continued display, on the display 13 of the cyclically determined value of the overall field Hg applied to the sensor 11. The transducer 12 may, for example, be a wheel speed sensor, as well known in antibrake lock systems; alternatively, external pulses can be supplied upon rotation of the vehicle.

Let it be assumed that the vehicle is now moved in a circular path and the sensor 12 provides pulses $i_s$. Rather than entering the loop 25, step 24 will provide a "yes" output and, in the subsequent step 26, the microcomputer 10 will test whether the measured values Hx and Hy are a maximum for the particular circular path. Upon beginning, or the first path, this is necessarily the case because there are no lower levels in a prior step. Consequently, in step 27 the values are transferred to a register "REG" for storage. Step 28 now determines if the values Hx and Hy represent a minimum. This, of course, also is the case upon the first circular path. These values, thus, are stored in a "minimum" memory register 29. Step 30 tests if, within the predetermined time clock, pulses $i_s$ from the path transducer continue to occur, that is, it is determined if the first circle has been terminated. If this is not the case, a loop 31 is entered into and the steps 21 to 29 will repeat.

As the values Hx, Hy increase during the circular path, step 27 stores always the maximum value; this permits skipping of step 29. Upon decreasing of values Hx, Hy, the newly found minimum values are stored in the minimum register 29 by replacing the previously stored values by the newly determined values permitting skipping of step 27.

After termination of the circle, the vehicle is stopped. No more pulses $i_s$ from the transducer 12 will be supplied, which is determined in step 30, and, hence, a subsequent step 32 will transfer the values from the maximum register 27 and the minimum register 29, found in steps 27 and 29, to permit the value of the disturbance field Hs to be determined from the maximum and minimum values of the overall field Hg as the vehicle has gone through the circle and the locus 0 has been cycled. The level of the disturbance field Hs is then determined in accordance with the above-discussed mathematical relationships (1), (2), (3).

In a subsequent step, step 33, the 7-segment display 17, on the display panel 13, can indicate the level of the disturbance field.

The geomagnetic field has a field strength of about 16 A/m. The saturation field strength of typical magnetometers Hs is about 70 A/m. The determination of the level of the disturbance field Hs, preferably, should be continued at respectively different suitable locations for the sensor 11 until at least one location is found where the field strength of the disturbance field Hs is equal to or, more preferably, less than half of the saturation field strength of the sensor 11, or, mathematically, $$(Hs \leq \tfrac{1}{2} H_{max} \leq 35 \text{ A/m}) \qquad (4)$$

It is particularly preferred and desirable to find a location for the sensor 11 in which the disturbance field Hs is the same or, most desirably, less than the field strength of the earth field, that is, is less than about 16 A/m.

The effects of electrical loads, generating stray fields, should also be considered and the steps previously discussed may have to be repeated with the loads connected.

In a simplified embodiment, it may be sufficient to carry out navigation with only one locus curve 0 stored in the microcomputer 10. For such an arrangement, the magnetic field sensor 11 must be placed in a location in which the magnetic field does not change upon energization of a load, electrical equipment or change in the magnetic configuration of the vehicle, for example upon opening or closing of roof vent.

In a simplified embodiment, it is sufficient to determine the location of installation of the sensor 11 by indicating only the instantaneous then pertaining level of the magnetic field to be measured. The maximum and minimum of the value then must be noted, or written down, or otherwise recorded, for example manually, while the vehicle is in its circular path, so that the average value can be formed thereby in order to determine the stray field $$Hs = \tfrac{1}{2} \cdot (H_{max} + H_{min}) \qquad (5).$$

Various changes and modifications may be made; the determination of the optimum installation location for the magnetic field sensor 11 can be carried out, of course, without the LCD 13 and the microcomputer 10. It is entirely possible to utilize suitable measuring elements on the magnetic field sensor 11 which indicate the respective measured entire magnetic field Hg as a maximum level as well as with the respective orthogonal components Hx and Hy. It is equally possible to determine, by a suitable and simple computation program of the microcomputer 10, the value of the overall field Hg from the measured X values and Y values and store it, for example in a buffer register. Upon rotation of the vehicle by 360°, the point P5 corresponding to the maximum level, and the point P6 corresponding to the minimum level of the magnetic field Hg, is thereby determined (see FIG. 2) and, subsequently, in accordance with formula (5) above, by addition of the half-values thereof, the level of the disturbance field Hs can be determined. Additionally, it is also possible to determine the level of the disturbance field by referring to the measuring points P1 and P2, or P3 and P4 relating to the respective x measured values and y measured values. The accuracy of measurement could be slightly smaller, however, due to small differences in measured values $H_{y1}$, $H_{y2}$, or $H_{x3}$, $H_{x4}$, respectively.

A suitable microcomputer 10 carrying out the programming steps has the following components:
CPU TMP 784COO (Tøshiba)
CTC TMP 784C30 (Tøshiba)
RAM HM 6116 LP (Hitachi)
EPROM TMP 27C128 JE (Texas Instr.)

This microcomputer, also, includes registers for intermediate storage of arithmetic results.

A suitable transducer 11 is described in: U.S. Pat. No. 3,936,949. A suitable path or vehicle movement transducer 12 is described in: U.S. Pat. No. 4,316,114, LEVIJOKI/GM.

We claim:

1. Method permitting relatively unskilled installers to install in a vehicle, a navigational magnetic field sensor (11) in a location where saturation of said sensor and consequent erroneous navigation indications are avoided, in which the entire magnetic field to which the field sensor is subjected is composed of the geomagnetic field and, when present, a stray or disturbance field resulting from at least one of permanent magnetic characteristics of said vehicle and transient magnetic fields emanating from energized equipment in said vehicle, the magnetic field sensor is responsive to the entire magnetic field permeating the sensor, navigation of the vehicle is guided by reference to the geomagnetic field forming at least a component of the entire field, a vector diagram of a measured magnetic field vector with respect to axes (x, y) of said sensor, upon rotation together of said vehicle and sensor, traces out and defines a locus curve (O) which has a center point (M), and in which the disturbance field causes a shift of the center point (M) of the locus curve from a null position in an orthogonal vectorial system, which shift is determined by the disturbance field present at the location of the magnetic field sensor, said method comprising, in accordance with the invention, the steps of determining field strength values ($Hx_{max}$, $Hy_{max}$) which represent saturation of said sensor along each of its respective axes (x,y) and, iteratively, (a) securing the field sensor (11) at a new location in the vehicle;

(b) moving the vehicle through 360°;

(c) continuously measuring, during movement of the vehicle, field strength values and determining, in an evaluation circuit (10, 13) coupled to the field sensor (11), which of said measured values represent the maximum and minimum value, along each axis, of the entire field vector ($Hg_x$, $Hg_y$) encountered during said 360° movement; and (d) determining the magnitude, along each axis, of the disturbance field ($Hs_x$, $Hs_y$) at said new location;

at least until the field strength of the disturbance field (Hs) is not greater than half the saturation field strength ($Hx_{max}$, $Hy_{max}$) of the magnetic field sensor (11).

2. The method of claim 1, including repeating the steps (a)–(d) until the level of the stray or disturbance field (Hs) at a location is equal to or less than the earth magnetic field of about 16 A/m.

3. The mode of claim 1, including the steps of
providing the evaluation circuit in the form of a computer (100) and wherein
said disturbance field determining step further comprises running a program in said computer which calculates said disturbance field magnitude and outputs the calculated value on a display (13).

4. The method of claim 3, wherein, during turning of the vehicle by 360°, the maximum and minimum value (Hx, Hy) of the entire field (Hg) is determined and stored; and further including the step of calculating the level of the disturbance field (Hs) and displaying the disturbance field.

5. The method of claim 1, wherein the step (d) of determining the level of the disturbance field (Hs) comprises calculating the level of the disturbance field from the maximum and minimum value (Hx, Hy) of the entire field vector with respect to at least one of: the X axis; and the Y axis of a vectorial diagram.

6. The method of claim 1, wherein the vehicle includes electrical appliances generating magnetic fields; and wherein, after a minimum level of disturbance field has been determined, at least one of the electrical appliances is energized, and steps (a)–(d) are repeated until a sensor location in said vehicle is found where said disturbance field is minimized while said at least one appliance remains energized.

* * * * *